US012654833B2

(12) United States Patent
Persson et al.

(10) Patent No.: US 12,654,833 B2
(45) Date of Patent: Jun. 16, 2026

(54) JOYSTICK DEVICE FOR A VEHICLE

(71) Applicant: CPAC SYSTEMS AB, Gothenburg (SE)

(72) Inventors: Jonathan Persson, Härryda (SE); Eric Gustafsson, Gothenburg (SE)

(73) Assignee: CPAC SYSTEMS AB, Gothenburg (SE)

( * ) Notice: Subject to any disclaimer, the term of this patent is extended or adjusted under 35 U.S.C. 154(b) by 595 days.

(21) Appl. No.: 18/154,115

(22) Filed: Jan. 13, 2023

(65) Prior Publication Data

US 2023/0227140 A1     Jul. 20, 2023

(30) Foreign Application Priority Data

Jan. 20, 2022     (EP) ..................................... 22152523

(51) Int. Cl.

| | |
|---|---|
| *B63H 25/02* | (2006.01) |
| *B62D 5/00* | (2006.01) |
| *B63H 20/06* | (2006.01) |
| *B63H 21/21* | (2006.01) |
| *G05G 9/047* | (2006.01) |

(52) U.S. Cl.
CPC ............. *B63H 25/02* (2013.01); *B62D 5/006* (2013.01); *B63H 20/06* (2013.01); *B63H 21/21* (2013.01); *B63H 21/213* (2013.01); *G05G 9/047* (2013.01)

(58) Field of Classification Search
CPC ........ B63H 25/00; B63H 25/02; B63H 25/42; B63H 21/00; B63H 21/21; B63H 21/213; B63H 20/00; B63H 20/06; G05G 9/047; B62D 5/006

USPC ....................................................... 114/144 R
See application file for complete search history.

(56) References Cited

U.S. PATENT DOCUMENTS

| | | | | |
|---|---|---|---|---|
| 9,039,468 | B1 | 5/2015 | Arbuckle et al. | |
| 9,248,898 | B1 | 2/2016 | Kirchhoff et al. | |
| 9,387,916 | B2 | 7/2016 | Skauen | |
| 9,556,806 | B1 | 1/2017 | O'Brien et al. | |
| 11,820,481 | B2 * | 11/2023 | Bondesson | .......... B63H 21/213 |
| 2015/0127197 | A1 | 5/2015 | Lindeborg | |
| 2021/0070414 | A1 | 3/2021 | Bondesson et al. | |

FOREIGN PATENT DOCUMENTS

| | | |
|---|---|---|
| CN | 87107465 A | 9/1988 |
| CN | 102582674 A | 7/2012 |
| EP | 0271617 A1 | 6/1988 |
| WO | 2019214829 A1 | 11/2019 |

OTHER PUBLICATIONS

Chinese Office Action dated Apr. 30, 2025 in corresponding Chinese Patent Application No. 202310042161.6, 19 pages.

(Continued)

*Primary Examiner* — Lars A Olson

(74) *Attorney, Agent, or Firm* — Jeffri A. Kaminski; Venable LLP

(57) ABSTRACT

A joystick device is operable to provide speed, direction and steering commands for controlling a marine vessel. A marine propulsion control system controls a set of propulsion units carried by a hull of a marine vessel, wherein the marine propulsion control system is adapted to receive an input command from such a joystick device.

15 Claims, 4 Drawing Sheets

(56) References Cited

OTHER PUBLICATIONS

Extended European Search Report in corresponding European Application No. 22152523.1 dated Jul. 18, 2022 (5 pages).
European Communication under Rule 71(3) EPC dated Sep. 12, 2024 in corresponding European Patent Application No. 22152523. 1, 31 pages.
Chinese Office Action dated Dec. 25, 2025 in corresponding Chinese Patent Application No. 202310042161.6, 14 pages.

* cited by examiner

JOYSTICK DEVICE FOR A VEHICLE

TECHNICAL FIELD

The present disclosure generally relates to a joystick device operable for controlling a vehicle, such as for example a marine vessel. The present disclosure also relates to a marine propulsion control system controlling a set of propulsion units carried by a hull of a marine vessel, wherein the marine propulsion control system is adapted to receive an input command from such a joystick device.

BACKGROUND

Today's marine vessels are often equipped with a plurality of propulsion units for driving the vessel. In a typical implementation, the marine vessel comprises a steering wheel for controlling a direction of the marine vessel and at least one thrust regulator for controlling a speed and direction of the propulsion units. In addition, it has been proposed, e.g., in U.S. Pat. No. 9,266,594, to additionally use a joystick device for allowing docking of the marine vessel.

To further simplify marine vessel operation, it has been proposed to combine the functionality of the steering wheel, the thrust regulator and the joystick into a single "boat maneuvering joystick", as is exemplified in U.S. Pat. No. 9,387,916. The boat maneuvering joystick disclosed in U.S. Pat. No. 9,387,916 comprises a base with sensors arranged for detecting a position of the maneuvering joystick. The maneuvering joystick comprises a first bidirectional control knob and a second bidirectional control knob, arranged movably relative each other. The maneuvering joystick also comprises first control sensors detecting a first position of the first bidirectional control knob and second control sensors detecting a second position of the stern control knob.

Accordingly, by means of U.S. Pat. No. 9,387,916 it is possible for an operator to solely concentrate on a single device for operating the marine vessel. However, the solution presented in U.S. Pat. No. 9,387,916 is cluttered with buttons and knobs for achieving the desired "combinatory effect" (i.e., combination of steering wheel, thrust regulator and docking joystick), whereby operation of the marine vessel by the e.g., an inexperienced operator will be overly complicated.

Accordingly, there appears to be room for further improvements regarding joysticks adapted for providing the mentioned combinatory effect, specifically focused on achieving an overall simplified interface for operating a marine vessel.

SUMMARY

In accordance to another aspect of the present disclosure, the above is at least partly alleviated by means of a joystick device operable to control a vehicle, the joystick device having a movable steering member extending on an axis and adapted to be tilted from a neutral position in at least two directions including a forward and a backward direction, wherein the joystick device comprises a control unit, and wherein the joystick device is provided with a forward gear engagement position defined between the neutral position and a maximum forward end position, the movable steering member is configured to be self-centered to the forward gear engagement position after positioning the movable steering member between the forward gear engagement position and the maximum forward end position, and the control unit is adapted to generate control commands to increase a forward speed of the vehicle and then maintain the increased forward speed if the movable steering member is moved from the forward gear engagement position towards the maximum forward end position and then released.

The general idea with the present disclosure is to allow for a simplified operation of the joystick device for controlling a vehicle, with the focus on making the control of the vehicle more intuitive as compared to prior art solutions. This is in line with the present disclosure achieved by implementing a "detent function" coinciding with the above mentioned forward gear engagement position, where once the movable steering member has reached or passed (in a forward direction) the forward gear engagement position, the joystick device will be provided with a slightly altered functionality as compared to when operating the movable steering member between the neutral position and the forward gear engagement position.

Accordingly, once the movable steering member has at least been moved to the forward gear engagement position the movable steering member will be self-centered to the forward gear engagement position, i.e., even if an operator maneuvering the movable steering member would move away his hand from the movable steering member. This self-centering function will then remain until the operator again moves the movable steering member back again to the neutral position. Additionally, once the self-centering function at the forward gear engagement position is active, then any movement of the movable steering member in the forward direction towards the maximum forward end position will result in an increase forward speed of the vehicle. When the operator moves away his hand from the movable steering member, the movable steering member will accordingly "spring back" to the forward gear engagement position, while the increased forward speed still will be maintained.

An advantage following this implementation is that the operator will be visually informed as to the currently active functionality, i.e., by means of the stationary position of the movable steering member. That is, once the movable steering member is at the forward gear engagement position the vehicle is moving forward with an active forward speed. Similarly, once the movable steering member is at the neutral position no active forward speed is initiated by the joystick device. Additionally, by allowing the forward speed of the vehicle to be increased and then maintained will generally simplify for an operator to make quick speed adjustments of the vehicle in a more intuitive manner as compared to general prior art implementations.

It is advantageous to further adapt the control unit to generate control commands to decrease and then maintain a decreased forward speed of the vehicle if the movable steering member is moved from the forward gear engagement position towards the neutral position. That is, it is in line with the present disclosure suitable to also, at least in general implementations, to implement a "speed decreasing function" in a similar manner as is implemented when the operator moves the movable steering member forward from the forward gear engagement position. Accordingly, the operator will be allowed to both increase (and maintain) as well as decrease (and maintain) a speed of the vehicles when moving the movable steering member forward and backward of the forward gear engagement position. It should, as indicated above, be noted that the functionality related to the forward gear engagement position is maintained until the operator moves the movable steering member back to the neutral position. That said, it may as an alternative, or also, be possible to implement a button or similar to disengage the functionality related to the forward gear engagement position.

Preferably, the joystick device is further provided with a backward gear engagement position defined between the neutral position and a maximum backward end position, the movable steering member is configured to be self-centered to the backward gear engagement position after positioning the movable steering member at the backward gear engagement position, and the control unit is further adapted to generate control commands to increase and then maintain an increased backward speed of the vehicle if the movable steering member is moved from the backward gear engagement position towards the maximum backward end position. Accordingly, it may in line with the present disclosure be possible to also implement the detent function in relation to a reverse operation of the vehicle, achieving similar advantages as when implementing the function in the above discussed forward operation of the vehicle.

Additionally, it is preferred to similarly to the discussion above further adapt the control unit to generate control commands to decrease and then maintain a decreased backward speed of the vehicle if the movable steering member is moved from the backward gear engagement position towards the neutral position. Accordingly, it will be possible to adjust the speed by moving the movable steering member between the backward gear engagement position towards the neutral position to achieve the discussed intuitive sped reduction of the vehicle.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a minibus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Accordingly, similar to a ground vehicle having wheels, belts, etc., for providing mobility on terrain, an "aerial vehicle" may have one or more propellers, wings, fans, or the like, for providing the ability to maneuver in the air.

An "aquatic vehicle", or marine vessel, may be understood to be any type of vehicle, as described above, which is capable of maneuvers on or below the surface of liquid, e.g., a boat on the surface of water or a submarine below the surface of water. It is appreciated that some vehicles may be configured to operate as one or more of a ground, an aerial, and/or an aquatic vehicle.

The joystick device according to the present disclosure is equally useful in relation to any one of the above-mentioned vehicle types. However, the below discussion will mainly focus on the use of the joystick device in relation to a marine vessel.

The discussion above is given in relation to control of a speed of the vehicle by means of control commands generated by the joystick device. It should be understood that these control commands may be configured to control at least one of a vehicle speed, a rotational speed (rpm) of a propulsion unit comprised with the vehicle, or a torque of the propulsion unit comprised with the vehicle. Equally, an overall active speed as is desired is hereby controlled using the joystick device. It should however be understood that some situations when an active speed is desired not necessarily will result in an adjusted speed over ground (as measured e.g., using a global positioning system). That is, an inclination of a road when operating a ground vehicle or a current when operating e.g., a marine vessel may have impact on how the vehicle is moving. Accordingly, as mentioned above an adjustment of a speed may also relate to a general control of a propulsion unit, such as by means of an adjusted rotational speed of the propulsion unit.

It should however be understood that the neutral position not necessarily may result in the trust provided by the propulsion units is set to zero. Rather, in some embodiments it may be possible that the neutral positions relate to a predetermined "geographical position", such as a GPS position, where e.g., the operator has a desire that the vehicle should stay (such as during a fishing expedition when the vehicle is a marine vessel). As such, the neutral position may still result in that some thrust is provided by some of the propulsion units to counter e.g., currents and wind such that the vehicle "stands still".

Furthermore, it may in some embodiments be desirable to allow the forward and/or the backward speed to be dependent on an amount of an angular forward movement of the movable steering member. Accordingly, in some embodiments an in comparison greater inclination will result in a greater change in the speed as compared to a smaller inclination. That said, in an alternative embodiment it may be possible to allow for a fixed amount of change in the speed once the movable steering member is moved forward/backward as seen from the forward/backward gear engagement position.

In one possible embodiment of the present disclosure the joystick device is adapted to selectively operate in one of a driving mode and a docking mode, wherein the forward (and/or the backward) gear engagement position is only available when the joystick device is operated in the driving mode. Accordingly, when in a docking mode it may be desirable to not implement the detent function, meaning that the operator will be allowed to operate the movable steering member all the way from the neutral to the maximum forward (and/or the backward) end position without the movable steering member "sticking" at the forward (and/or the backward) gear engagement position.

Possibly, arranging the joystick device in the driving mode may in one embodiment be achieved by arranging the joystick device to further comprise an actuator, where the actuator is arranged to move the movable steering member to the forward gear engagement position to arrange the joystick device in the driving mode. In an exemplary embodiment, a button is provided for transitioning the joystick device to the driving mode. As such, when the operator pushes the button the movable steering member will automatically by means of the actuator move to the forward gear engagement position and the driving mode is activated.

To deactivate the driving mode, it may be possible to make use of the same button as for activating the driving mode. However, it may also be possible to adapt the joystick device in such a manner that the driving mode is deactivated by manually moving the movable steering member to the neutral position.

In some embodiments, deactivation of the driving mode automatically turns on the docking mode. Generally speaking, the docking mode is a low-speed driving mode, and the driving mode is a high-speed driving mode. As such, the docking mode is generally suitable for use when moving the vehicle at low speeds, such as in a harbor when the vehicle is a marine vessel.

In line with the above discussion, in accordance with the present disclosure, the movable steering member may in one embodiment be adapted to be tilted from the neutral position in an arbitrary direction including the forward, the rearward, the leftward, and the rightward direction. As such, independent on if the joystick device is in the driving mode or in the docking mode; the joystick may be used for controlling direction of the vessel not being just a forward or backward direction. However, the arbitrary tilting of the movable steering member may also be limited to one of the modes. As such, in one embodiment the arbitrary tilting of the movable steering member is limited to the docking mode.

Furthermore, it may in some embodiments of the present disclosure be possible to allow the movable steering member to be rotatable around the axis for providing rotational commands for controlling the vehicle. That is, the joystick device may in such an embodiment advantageously be used for "twisting" the vehicle (yaw). Specifically, by rotating/twisting the movable steering member, the vehicle is controlled to rotate/twist. The twisting/rotating action may preferable be allowed to be performed both in a clockwise and an anti-clockwise manner, thus rotating/twisting the vehicle in a corresponding manner.

It is further preferred to implement the twisting/rotating of the movable steering member such that the movable steering member automatically may return to a rotational neutral position thereof, e.g., once the operator lets go of the movable steering member. Such an implementation may for example comprise one of a plurality of springs for achieving the return function.

It should however be understood that it in some embodiments may be preferred to only allow the rotation/twisting to take place when the joystick device is in the docking mode. That is, in case the driving mode is the above exemplified high-speed mode, such a yaw operation may be undesirable and may result in an undesirable wear on the propulsion units as well as related control equipment comprised with the vehicle.

That said, it may however in some situations be allowed to perform the twisting action also in the driving mode, possibly implemented in a slightly different manner for achieving a rotational motion of the vehicle in some operational situations.

In a further embodiment of the present disclosure, it may be possible to provide the joystick device with feedback means adapted to create a haptic effect perceivable at the movable steering member. Accordingly, depending on e.g., the direction of inclination of the movable steering member (such as at an end position in regard to inclination), the operator holding e.g., a hand at the movable steering member may be given feedback, typically without the operator having to look at the movable steering member for determining in what direction the movable steering member is inclined. The haptic effect may also be provided for different purposes, e.g., for indicating an upcoming obstacle in case the vehicle is to continue to move in the current direction, etc., based on e.g., information received from another control system comprised with the vehicle.

In a possible embodiment the joystick device as has been discussed above is provided as a component of a marine vessel, further comprising a set of propulsion units carried by a hull of a marine vessel. The joystick device will in such an embodiment be arranged to provide a set of control commands for controlling a desired delivered thrust, gear selection and steering angle for the set of propulsion units. Preferably, the set of propulsion units comprises at least a first and a second propulsion unit. That said, further or only a single propulsion unit may be used on relation to the marine vessel. Further propulsion units may for example be included, such as e.g., a bow thruster.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1:
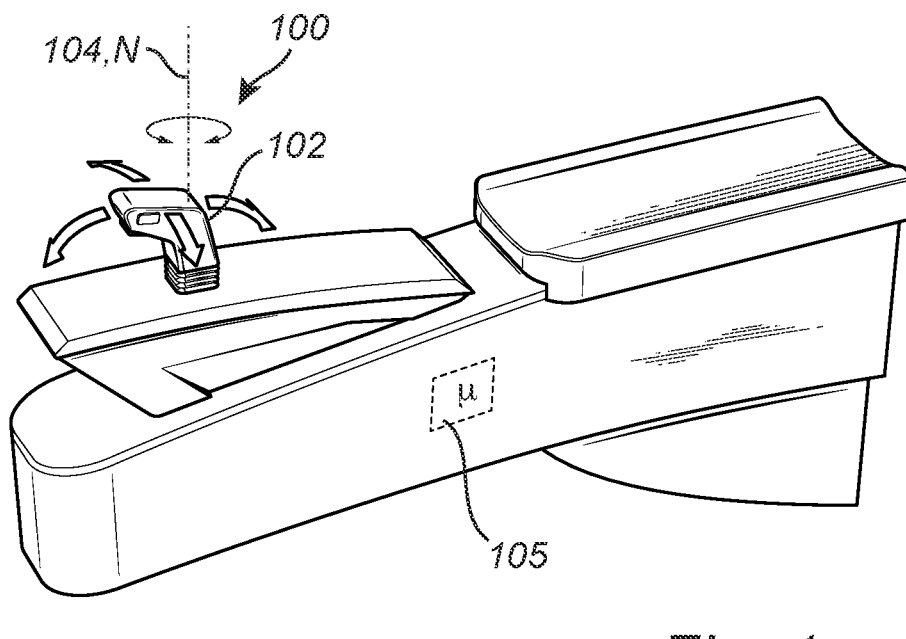
FIG. 1 conceptually illustrates a joystick device according to the present disclosure, FIGS. 2A and 2B provides illustrative examples of the operation of the joystick device.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 4:
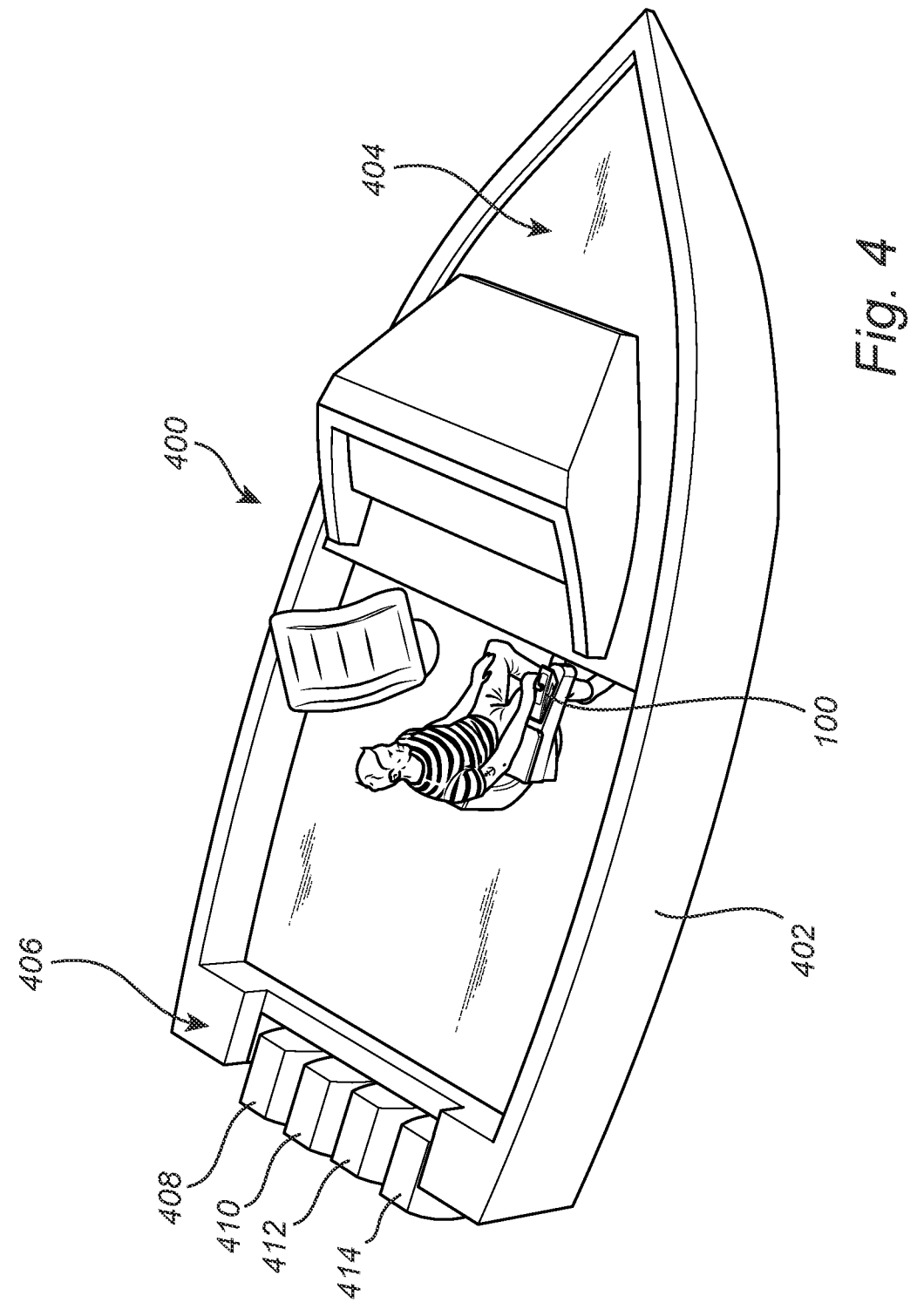

Referring now to the drawings and to FIG. 1 in particular, there is conceptually depicted a joystick device 100 adapted for controlling a marine vessel 400 (as is illustrated in FIG. 4). The joystick device 100 is arranged to be operated in at least a driving mode and a docking mode. Generally, and as has been discussed above, the driving mode is a high-speed driving mode, and the docking mode is a low-speed driving mode. As such, the driving mode is generally useful when operating the mentioned marine vessel in an open area or at open sea, whereas the docking mode is suitable for use when moving the vehicle at low speeds, such as in a harbor when the vehicle is a marine vessel. The docking mode is as such provided for high controllability, when the vessel for example is operated below five knots. Accordingly, when in the driving mode the vessel is generally operated at speeds above five knots.

The joystick device 100 comprises a movable steering member 102 extending on an axis and adapted to be tilted from a neutral position N in at least four directions including a forward, a rearward, a leftward, and a rightward direction. Thus, the tilting direction of the movable steering member 102 is used for issuing commands for use in at least forward or reverse surge, left or right sway movement of the vessel. It should however be understood that the movable steering member 102 in some embodiments may be tilted/inclined in any direction, such as in between the forward and leftward direction, etc.

The joystick device 100 further comprises a control unit 105. The control unit 105 is connected to e.g., inclination sensors, etc. provided in relation to the movable steering member 102, where such sensors are provided for generating data indicative of how the movable steering member 102 is moved in relation to e.g., the neutral position N.

Moreover, the movable steering member 102 may also be rotatably operated to issue an operating instruction for achieving a yaw movement of the vessel. In one embodiment this is accomplished by rotating the movable steering member 102 about its vertical axis, A. When the movable steering member 102 is altered from the neutral position N, a detection signal is transmitted to the control unit 105. For example, when an operator tilts the joystick to the port side and rotates it clockwise the propulsion units are controlled such that a hull of the vessel moves in a sway movement translational to the port side with a clockwise rotation.

Furthermore, it should be understood that the level of inclination, possibly dependent on if the joystick device 100 is arranged in the driving or the docking mode, may determine the level of trust to be provided for moving the vessel. That is, an increasing inclination of the movable steering member 102 may in some embodiment result in a comparable increase of the speed for movement of the vessel. The relation may possibly, but not necessarily, be linear. The joystick device 100 may for example comprise sensors (not shown) or other means for detecting a position of the movable steering member 102, such as the current inclination of the movable steering member 102.

The joystick device 100 further comprises feedback means (not shown) adapted to create a haptic effect perceivable at the movable steering member 102. Such feedback may for example appear when the movable steering member 102 has been pushed as far as possible to an "end tilting position". Preferably, the control unit 105 operates the feedback means.

Figure 2A:
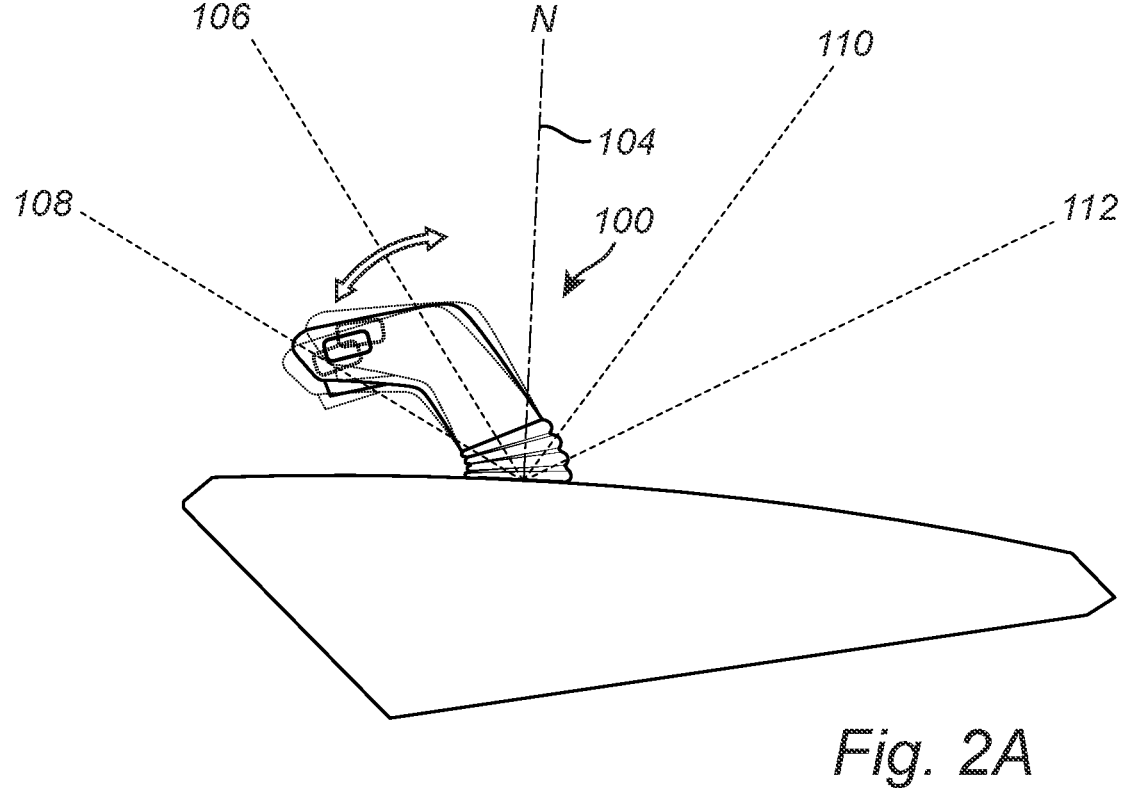

With reference to FIG. 2A, there is provided an exemplifying illustration of the operation of the joystick device 100 when the joystick device 100 is arranged in the driving mode. As discussed above, when the joystick device 100 is arranged in the driving mode, the joystick device 100 activates a detent function, at least in the forward direction but preferably also in the backward direction. In the illustration provided in relation to FIG. 2A, the detent function is exemplified both in the forward and the backward direction of operation of the movable steering member 102.

The detent for the forward direction is provided at forward gear engagement position 106 that is defined between the neutral position N and a maximum forward end position 108. In a possible embodiment the forward gear engagement position 106 is arranged at a 50% inclination angle between the neutral position N and the maximum forward end position 108. It may of course be possible to arrange the forward gear engagement position 106 at any predefined inclination angle between the neutral position N and the maximum forward end position 108.

Similarly, a backward gear engagement position 110 is defined between the neutral position N and a maximum backward end position 112. Also here, the backward gear engagement position 110 is arranged at a 50% inclination angle between the neutral position N and the maximum backward end position 112. It may of course be possible to arrange the backward gear engagement position 110 at any predefined inclination angle between the neutral position N and the maximum backward end position 112.

During operation in the driving mode, the movable steering member 100 is configured to be self-centered to the forward gear engagement position 106 after positioning the movable steering member 102 at the forward gear engagement position 106. Accordingly, as soon as the operator has manually moved the movable steering member 102 forward at least to the forward gear engagement position 106, then the forward detent function is activated. The joystick device 100 may also be provided with an actuator (not shown) for automatically moving the movable steering member 102 to the forward gear engagement position 106, where the forward detent function is activated. When the forward detent function is activated, the vessel will generally be arranged in an engaged gear, such that the vessel is moving forward at a predetermined speed.

When the forward detent function is activated and the movable steering member 102 is at the forward gear engagement position 106, the operator may "push" or move the movable steering member 102 in the forward direction from the forward gear engagement position towards the maximum forward end position. When performing such a push forward, the control unit 105 generates control commands to increase a forward speed of the vessel. If the operator then releases his hand from the movable steering member 102, the movable steering member 102 will spring back to the forward gear engagement position 106, but the increased speed will be maintained.

Similarly, in case the operator pushes the movable steering member 102 in the backward direction from the forward gear engagement position towards the neutral position N, but not all the way to the neutral position N, then the control unit 105 generates control commands to decrease the forward speed of the vessel. If the operator then releases his hand from the movable steering member 102, the movable steering member 102 will spring back to the forward gear engagement position 106, but the decreased speed will be maintained.

Figure 2B:
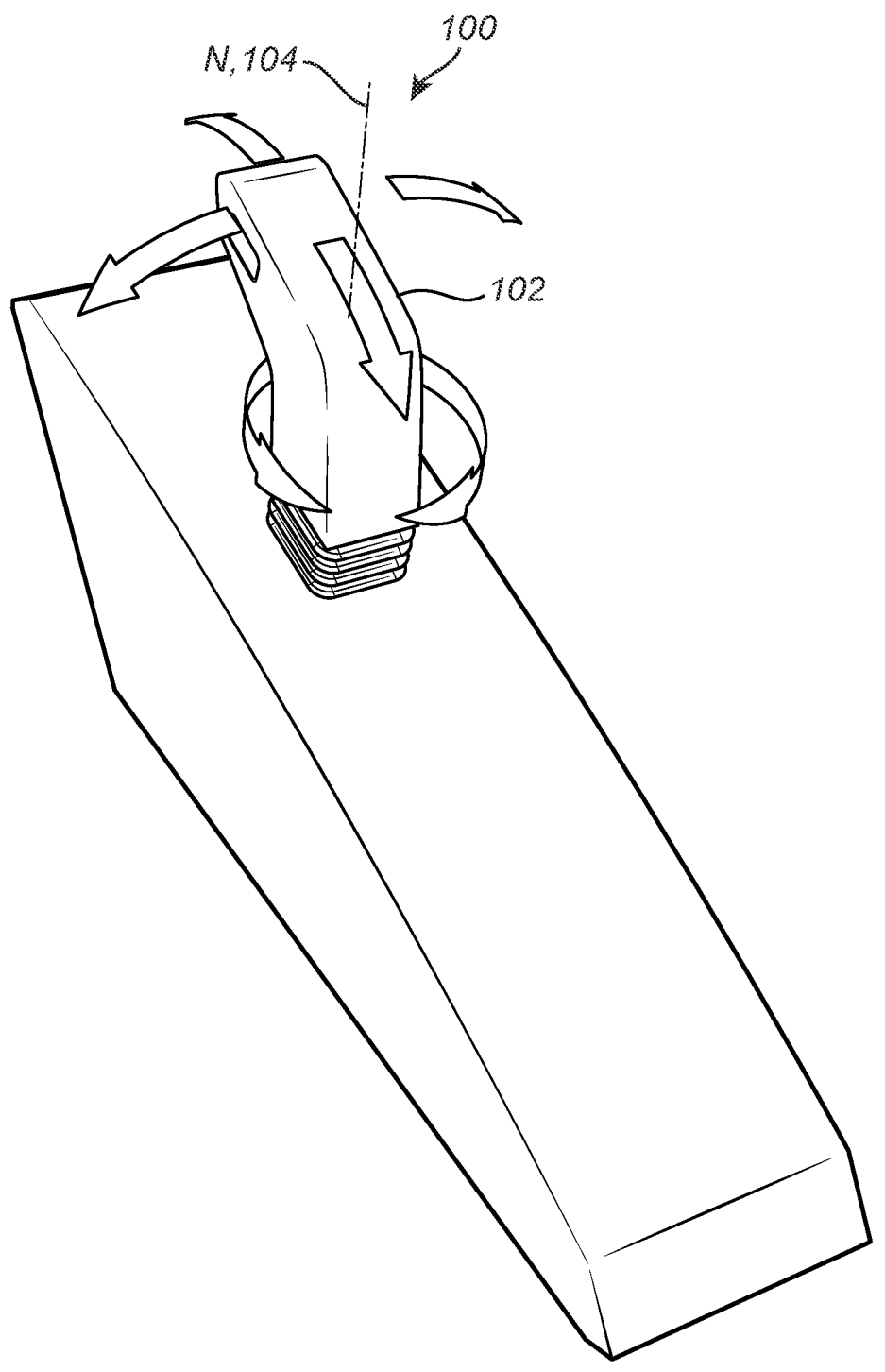

The joystick device 100 as shown in FIG. 2B is also adapted to provide a backward detent function. When the operator manually or the joystick device 100 automatically moves the movable steering member 102 towards the backward gear engagement position 110, then the backward detent function is activated and the vessel will generally be arranged in an engaged gear, such that the vessel is moving backward at a predetermined speed.

When the backward detent function is activated and the movable steering member 102 is at the backward gear engagement position 110, the operator may "push" or move the movable steering member 102 in the backward direction from the backward gear engagement position 110 towards the maximum backward end position 112. When performing such a push forward, the control unit 105 generates control commands to increase a backward speed of the vessel. If the operator then releases his hand from the movable steering member 102, the movable steering member 102 will spring back to the backward gear engagement position 110, but the increase backward speed will be maintained.

Similarly, in case the operator pushes the movable steering member 102 in the forward direction from the backward gear engagement position 110 towards the neutral position N, but not all the way to the neutral position N, then the control unit 105 generates control commands to decrease the backward speed of the vessel. If the operator then releases his hand from the movable steering member 102, the movable steering member 102 will spring back to the backward gear engagement position 110, but the decreased backward speed will be maintained.

A push at the movable steering member 102 may in some embodiments result in a fixed increase/decrease in the speed, such as a 5%, 10%, 15%, etc. increase/decrease in the speed. It may also be possible to measure an inclination of the movable steering member 102 and determine the increase/decrease of the speed depending on the inclination. Thus, a greater inclination (as compared to a smaller) will result in a greater increase of the speed. Turning now to FIG. 2B, there is provided an exemplifying illustration of the operation of the joystick device 100 when the joystick device 100 is arranged in the docking mode. In this docking mode, movable steering member 102 is adapted to be self-centered to the neutral position N from all directions of inclination, as is a normal and well-known operation of a joystick device. That is, once e.g., the operator let go of the movable steering member 102, the movable steering member 102 will automatically and accurately return to its neutral (center) position N. This may for example be achieved using plurality of springs.

In some embodiments of the present disclosure, it may be possible to allow the joystick device 100 to comprise e.g., a "button" (not shown) for allowing the operator to indicate if the joystick device 100 is to be in the driving or the docking mode.

However, it may in accordance with the present disclosure be possible to allow the transition from the driving to the docking mode to take place based on other "non-operator" initiated input. That is, the transition between the driving to the docking mode may for example take place in case it is determined, e.g., by an electronic control unit (ECU) comprised with the vessel and a GPS receiver, that the vessel travels above a predetermined speed. For example, in case the ECU determines that the vessel travels above e.g., five knots (should be understood as a non-limiting example), the joystick device 100 may automatically transition from the first to the driving mode. The transition may also (or alternatively) be location based (docking zone, map based) or time based.

Figure 3:
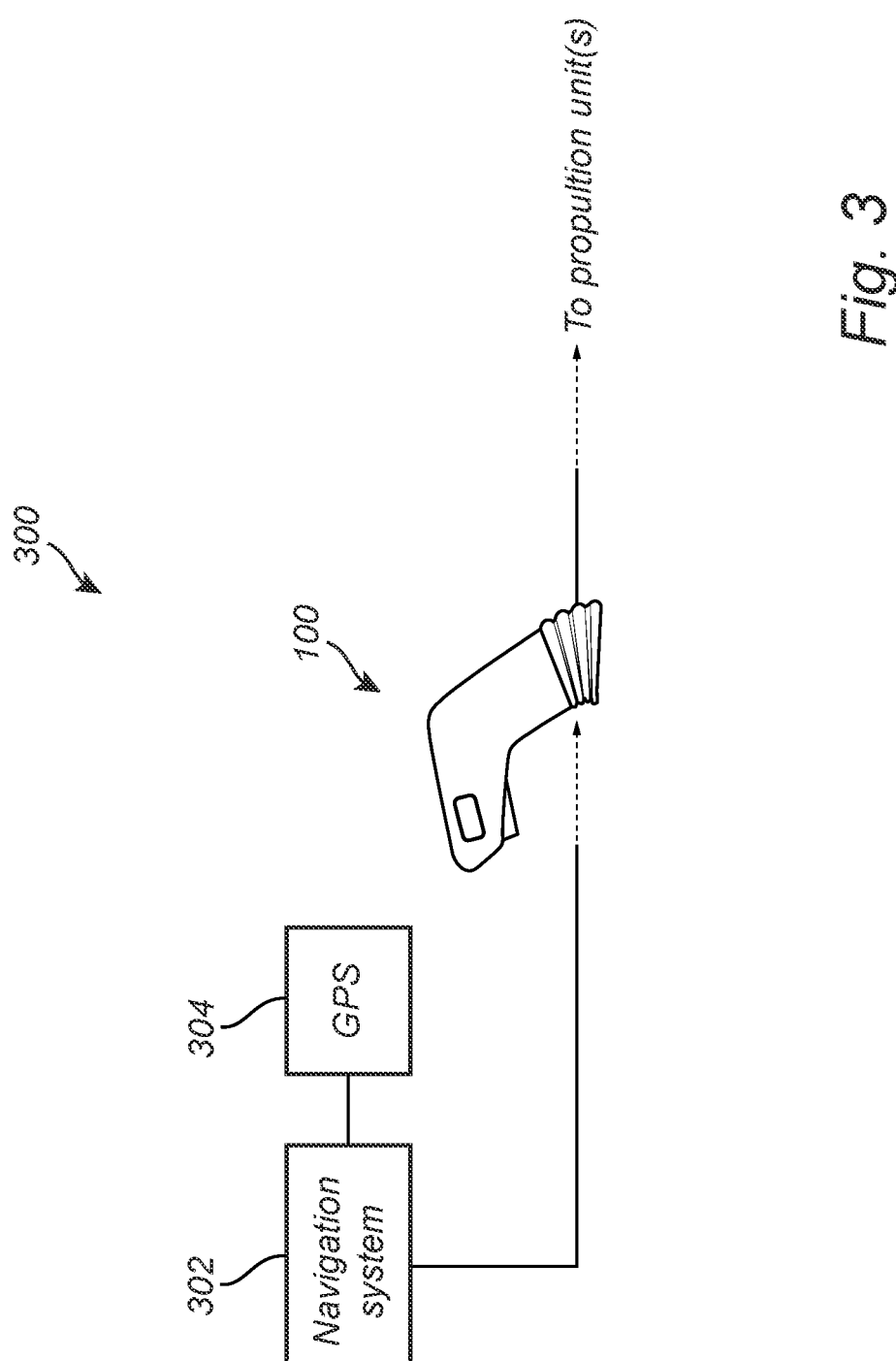
FIG. 3 presents a marine propulsion control system according to an embodiment of the present disclosure, and FIG. 4 exemplifies a marine vessel comprising a marine propulsion control system for operating the marine vessel using the joystick device of FIG. 1.

In some embodiments, and with further reference to FIG. 3 it may be desirable to allow the joystick device 100 to be comprised with a marine propulsion control system 300, where the marine propulsion control system 200 further comprises a navigation control system 302. In some embodiments it may be possible to adapt the navigation control system 302 to be arranged in communication with e.g., a GPS receiver 304 and to comprise e.g., a digital map being representative of at least the area where the marine vessel 400 is currently positioned. It may further be possible to adapt the navigation control system 302 to determine present coordinates for the vessel 300 based on information received from the GPS receiver 304.

Based on the present coordinates for the vessel 400 and the digital map it could be possible to determine a present speed limit for the area where the marine vessel 400 is located. The speed limit may in turn be used for automatically controlling the joystick device 100 to be operated in the driving mode or the docking mode.

Turning finally to FIG. 4, there shown an example of a marine vessel 400 comprising a marine propulsion control system for operating the marine vessel using the above-mentioned joystick device 100.

In the illustration provided, the vessel 400 is designed with a hull 402 having a bow 404, a stern 3406. In the stern 406, four propulsion units 408, 410, 412 and 414 may be mounted. The propulsion units 408, 410, 412 and 414 may be pivotally arranged in relation to the hull 402 for generating a driving thrust in a desired direction of a generally conventional kind. The propulsion units may alternatively be inboard propulsion units, mounted under the vessel on the hull 402, or mourned on the stern 406 as so-called stem drives. That is, the propulsion units 408, 410, 412 and 414 may be outboard propulsion units or inboard propulsion units.

It should be understood that the vessel 400 may be provided with more than four (or less) propulsion units. Furthermore, the vessel 400 may be provided with e.g., a bow thruster (not shown) for assisting in "moving" the bow 404, e.g., in windy situations. The 408, 410, 412 and 414, as well as the bow thruster, are operated based on the commands generated when tilting and/or rotating the movable steering member 102 in a manner as discussed above.

For reference, the control unit 105 as discussed above may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word comprising does not exclude other elements or steps, and the indefinite article "a" or "an" does not exclude a plurality.

The invention claimed is:

1. A joystick device operable to control a vehicle, the joystick device having a movable steering member extending on an axis and adapted to be tilted from a neutral position in at least two directions including a forward and a backward direction, wherein the joystick device comprises a control unit, the control unit comprising a processor and a memory, the memory storing instructions that, when executed by the processor, cause the control unit to:

define a forward gear engagement position between the neutral position and a maximum forward end position, monitor a position of the movable steering member, generate control commands to increase and then maintain an increased forward speed of the vehicle if the movable steering member is moved from the forward gear engagement position towards the maximum forward end position, and detect a mechanical spring-back of the movable steering member from a position towards the maximum forward end position to the forward gear engagement position, wherein the control unit is configured to maintain the increased forward speed upon detection of said spring-back, wherein the movable steering member is configured to be self-centered to the forward gear engagement position by a biasing force acting on the movable steering member when the movable steering member is positioned between the forward gear engagement position and the maximum forward end position.

2. The joystick device according to claim 1, wherein:

the control unit is further adapted to generate control commands to decrease and then maintain a decreased forward speed of the vehicle if the movable steering member is moved from the forward gear engagement position towards the neutral position.

3. The joystick device according to claim 1, wherein:

the joystick device is further provided with a backward gear engagement position defined between the neutral position and a maximum backward end position, the movable steering member is configured to be self-centered to the backward gear engagement position after positioning the movable steering member at the backward gear engagement position, and the control unit is further adapted to generate control commands to increase and then maintain an increased backward speed of the vehicle if the movable steering member is moved from the backward gear engagement position towards the maximum backward end position.

4. The joystick device according to claim 3, wherein:

the control unit is further adapted to generate control commands to decrease and then maintain a decreased backward speed of the vehicle if the movable steering member is moved from the backward gear engagement position towards the neutral position.

5. The joystick device according to claim 1, wherein the control commands are configured to control at least one of a vehicle speed, a rotational speed (rpm) of a propulsion unit comprised with the vehicle, or a torque of the propulsion unit comprised with the vehicle.

6. The joystick device according to claim 1, wherein forward speed is increased dependent on an amount of an angular forward movement of the movable steering member.

7. The joystick device according to claim 1, wherein forward speed is increased with a fixed amount when the movable steering member is moved forwards.

8. The joystick device according to claim 1, wherein the joystick device is adapted to selectively operate in one of a driving mode and a docking mode, wherein the forward gear engagement position is only available when the joystick device is operated in the driving mode.

9. The joystick device according to claim 8, further comprising an actuator for moving the movable steering member to the forward gear engagement position to arrange the joystick device in the driving mode.

10. The joystick device according to claim 9, wherein the joystick device is arranged in the docking mode by manually moving the movable steering member to the neutral position.

11. The joystick device according to claim 8, wherein the movable steering member is rotatable around the axis, when in the docking mode, for providing rotational commands for controlling the vehicle.

12. The joystick device according to claim 8, wherein the docking mode is a low-speed driving mode and the driving mode is a high-speed driving mode, a speed of the vehicle in the low-speed driving mode is lower as compared to the speed of the vehicle in the high-speed driving mode.

13. The joystick device according to claim 1, further comprising feedback means adapted to create a haptic effect perceivable at the movable steering member.

14. A marine vessel, comprising:

a set of propulsion units carried by a hull of the marine vessel, and a joystick device according to claim 1.

15. The marine vessel according to claim 14, wherein the set of propulsion units comprises at least a first and a second propulsion unit.

* * * * *